H. S. MacKAY.
APPARATUS FOR EXTRACTING METALS FROM ORES.
APPLICATION FILED JAN. 14, 1911.

1,074,274.

Patented Sept. 30, 1913.
5 SHEETS—SHEET 1.

WITNESSES:
David J. Walsh
K. C. Mead

INVENTOR
Henry S. MacKay
BY
Crampton
ATTORNEY

H. S. MacKAY.
APPARATUS FOR EXTRACTING METALS FROM ORES.
APPLICATION FILED JAN. 14, 1911.

1,074,274.

Patented Sept. 30, 1913.
5 SHEETS—SHEET 2.

H. S. MacKAY.
APPARATUS FOR EXTRACTING METALS FROM ORES.
APPLICATION FILED JAN. 14, 1911.

1,074,274.

Patented Sept. 30, 1913.
5 SHEETS—SHEET 3.

WITNESSES:
David J Walsh
K. C. Mead

INVENTOR,
Henry S. MacKay
BY
G. F. Crampton
ATTORNEY

H. S. MacKAY.
APPARATUS FOR EXTRACTING METALS FROM ORES.
APPLICATION FILED JAN. 14, 1911.

1,074,274.

Patented Sept. 30, 1913.
5 SHEETS—SHEET 4.

UNITED STATES PATENT OFFICE.

HENRY S. MACKAY, OF RIVERSIDE, CALIFORNIA, ASSIGNOR TO MACKAY COPPER PROCESS COMPANY, OF RIVERSIDE, CALIFORNIA, A CORPORATION OF ARIZONA.

APPARATUS FOR EXTRACTING METALS FROM ORES.

1,074,274.     Specification of Letters Patent.     Patented Sept. 30, 1913.

Application filed January 14, 1911. Serial No. 602,592.

*To all whom it may concern:*

Be it known that I, HENRY S. MACKAY, a citizen of the United States, and a resident of Riverside, California, have invented a new and useful Improvement in Apparatus for Extracting Metals from Ores, of which the following is a specification.

My invention relates to apparatus that may be used for extracting metals from their ores.

The object of the invention is primarily to produce a means for economically extracting metals from their ores. The apparatus is for the production and manipulation of agents or elements or compounds which will combine with a metal while in the ore and which may then be subsequently liberated and used again for the same purpose and with substantially its original chemical strength.

The invention also has for its object to remove the metal from the ore by means of a solution containing an active agent or agents and then to separate the agent or agents from the metal and at the same time liberate them in the solution in an active relationship or condition thereby reviving the solution to its former chemical potential.

It also has for its object to remove the metal from the revived solution immediately upon its formation.

In the accomplishment of my invention apparatus is provided which produces active elements in a solution which is brought into contact with the ore. The ore is thoroughly treated with the solution preferably by leaching the ore, thereby removing the metals from the ore. The desired metal, that is, the valuable metal which is sought to be removed from the ore, is extracted by treatment of the solution formed after the agents have chemically united with the metals of the ore. The solution is revived by freeing the agents from the desired metal into the solution. This restores the solution to its original solvent power. At the same time that the solution is revived the metal is removed from the active solution as fast as it is formed. This permits a continuous operation and prevents subsequent action of the agents on the desired metal. Successive charges of the ore are thus treated by the constantly revived solution.

For the purpose of illustrating the application of my invention and to show its operation I shall describe an apparatus embodying the invention and the operation of the system. I shall particularly describe its use in the extraction of copper from its ore. The apparatus may be greatly modified and used for the extraction of many metals from their ores and other chemical operations and yet such modification will still contain the essence of the invention.

Referring to the drawings

The solvent for extracting the metal from the ore may be prepared by treating a solution of salt, preferably a solution of a salt of an alkaline metal. Common salt (sodium chlorid) will accomplish the results desired. A solvent, however, may be prepared by addition and mixture of the compounds and elements in the proper proportions. Such a solution will have practically the same chemical activity and may be substituted for the solvent prepared from the salt and substantially the same results will be produced. If the solvent is prepared by treating a solution of common salt, the salt is dissolved in water until a required degree of concentration is produced. Sea water may be evaporated and used. Some natural waters may be used without evaporation or addition of salt.

Figure 1:
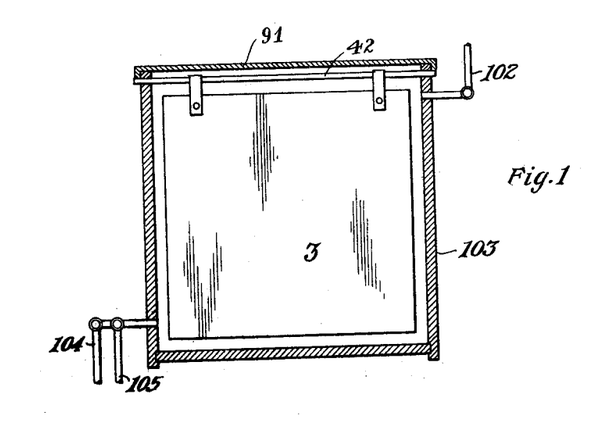
Figure 1 illustrates a vertical section of an electrolytic vat which is used in producing certain chemical agents in the process of formation of the solvent used for extracting the metal contained in the ore.
Figure 2:
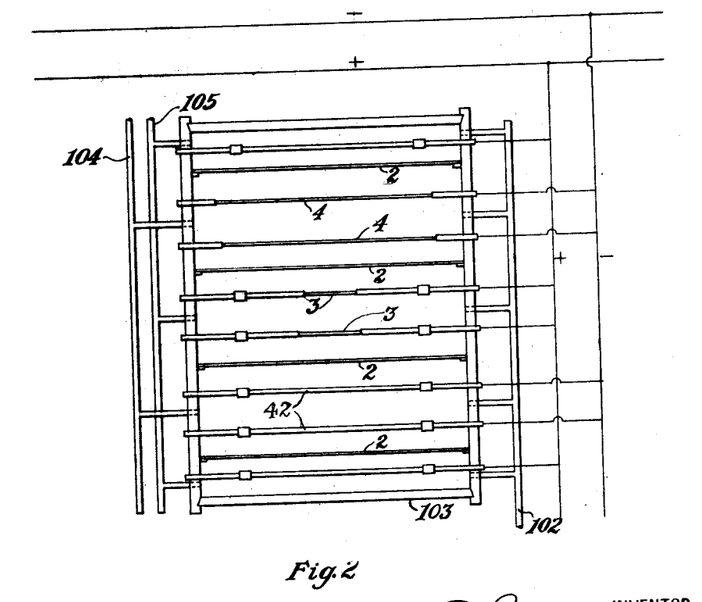
Fig. 2 is a top view.

The aqueous solution of sodium chlorid is directed into the electrolytic vat 103 shown in Figs. 1 and 2 until it is filled. The electrolytic vat is divided into compartments by means of diaphragms 2. Two electrodes are placed in each compartment excepting the end compartments which are provided with but one electrode in each case. They may be supported by means of straps attached to rods 42 which rest upon the walls of the vat. The electrodes 3, 4 are connected to a source of electric current, the electrodes 3 being connected with the positive terminal are the anodes while the electrodes 4 are connected with the negative terminal of the source of electricity and operate as the cathodes. The anodes are placed in the alternate compartments and likewise the cathodes. The compartments may thus be termed the anode compartments or the cathode compartments according to which element they contain. The vat is provided with the cover 91 to keep in the gases formed. The vat is filled by means of the pipe 102 which leads into each of the compartments. The solutions are drawn off by means of the pipes 104 and 105. Pipe 104 removes the solution that is produced in the cathode compartments and pipe 105 removes the solution that is produced in the anode compartments.

The solution is electrolyzed in the presence of a material of such a character that with the particular solution used it will produce a solvent of the metal or its compound contained in the ore which is to be operated upon. It is found preferable to make the anode of the desired material such as a metal which will be acted upon by the agents produced in the electrolysis and which will produce a solvent for the metal of the ore. I have found it preferable to make the anodes of iron. The cathodes are made of a soluble or insoluble material.

Passing an electric current through the solution using a metal anode results in the decomposition of the sodium chlorid and if iron is used for the anodes ferrous and ferric chlorids are formed and chlorin is liberated. The solution is also treated in a second vat but which contains insoluble anodes and soluble or insoluble cathodes. If it is desired the anodes themselves may be changed without removal of the fluid or if desired a continuous flow of the fluids may be produced while they are being operated upon in the electrolytic processes.

Figure 3:
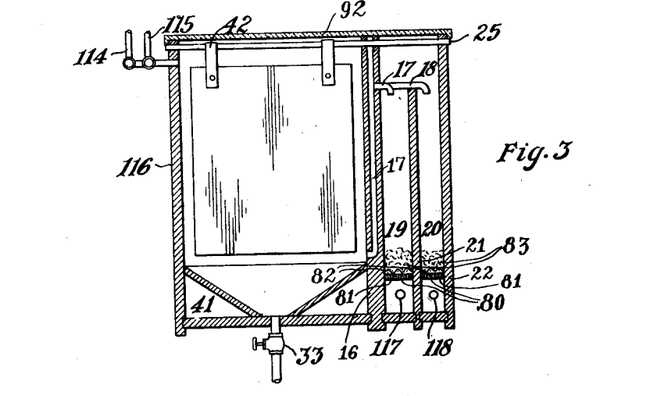
Fig. 3 is a vertical section and Fig. 4 is a top view of an electrolytic vat which completes the formation of the solvent.
Figure 4:
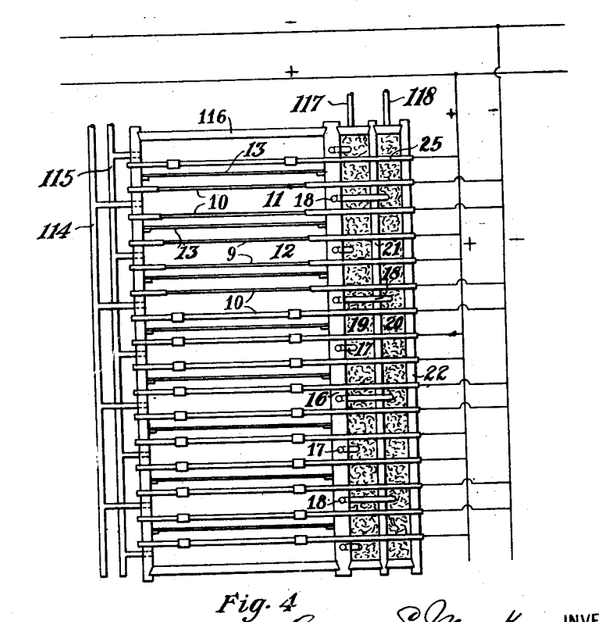

In Figs. 3 and 4 is shown a vat 116 in which the process of generation of the active solvent is completed. The insoluble electrodes 9 and 10 located in the vat 116 are supported by rods 25. Electrodes 9 are connected to the positive terminal of the source of electric current and constitute the anode elements. Electrodes 10 are connected to the negative terminal of the source of current and constitute the cathode elements. The vat is divided into compartments 11 and 12 by the porous diaphragms 13. The anodes are located in one set of compartments and the cathodes are located in intermediate compartments. The fluids are directed into the vat by means of the pipes 114 and 115. The pipe 114 directs one fluid into the cathode compartments and the pipe 115 directs the other fluid into the anode compartments. The vat is provided with the cover 92 which may be made of glass to allow light into the vat. The vat is provided with chambers for the collection of fluids produced in the electrolysis. The wall 16 of the vat is provided with passages and tubes, 17 and 18, which connect the compartments with chambers 19 and 20. The chambers are formed between the walls 16, 21 and 22. The passages are connected with the interior of the vat near the lower edge of the plates. The pipes 114 and 115 are connected at the top of the vat. A flow of the fluids may be produced diagonally across the compartments while the solution is being operated upon. The porous plates 80 are placed near the bottom of the chambers 19 and 20. The plates may be provided with holes 81. Filter cloth 82 is placed over the plates 80 and a filter material of asbestos or other material that will not be acted upon by the chemical agents of the solution formed in the vat, is placed on the filter cloths. The fluids are removed from the chambers and from below the filters by means of the pipes 117 and 118.

When a sufficient quantity of a solvent is prepared it is brought into contact with the ore. It may be allowed to remain quietly on the ore but I find it preferably to agitate the ore and solution. One part of the solution by weight to one part ore to two parts solution to one part ore is used as may be desired in leaching the ore, varying the proportion according to the fineness to which the ore is crushed and the texture and character of the rock.

Figure 5:
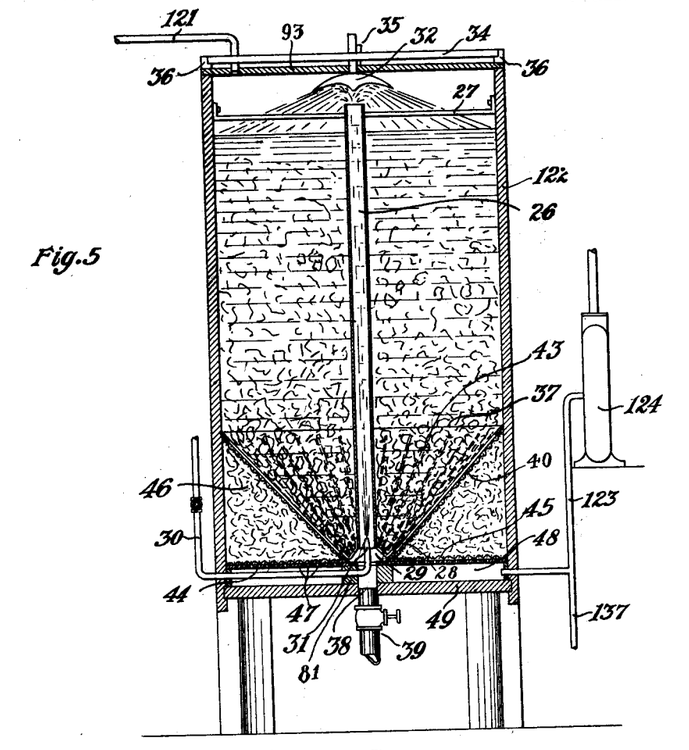
Figs. 5 and 6 illustrate a means for bringing the solvent into chemical contact with the metal of the ore.
Figure 6:
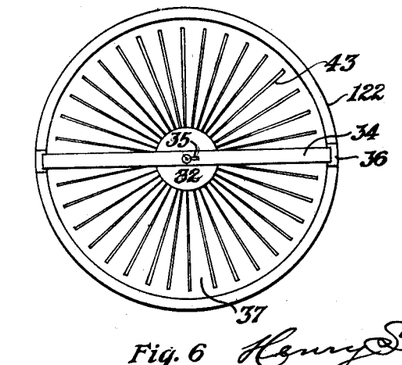

In Figs. 5 and 6 is illustrated an agitator. A central tube 26 is located in the interior of the agitator 122. It is held in position by a cross bar 27 and by the supporting legs 28. The lower end of the tube terminates near the bottom of the vat leaving a small space 29 between the end of the tube and the bottom of the receptacle. A pipe 30 leads to a nozzle 31 which extends a short distance into the lower end of the tube 26. The pipe 30 is adapted to conduct fluids—liquids or gases—into the interior of the tube and to direct them with some force along the axis of the tube. 32 is a deflector which is located a short distance from the upper end of the tube. The deflector is secured to the cross bar 34 by means of a key or wedge 35. The bar 34 is supported on the uprights 36 which may form integral parts of the vat. The deflector 32 is adapted to direct the fluids arising in the tube 26 to the walls of the tank. If the tank contains material to be agitated the incoming fluid passing up through the tube 26 from the nozzle 31 carries with it the material contained in the bottom of the receptacle. The material in the bottom of the tank is drawn into the tube 26 and is forced upward against the deflector 32 which causes it to spread to the walls of the tank from thence it works down to the bottom of the tank to be again caught by the upward current in the tube 26. A continuous operation is thus produced causing a continuously changing contact between the material contained in the vat whereby the chemical processes may be accomplished. The receptacle may be provided with a cover 93. In order to facilitate the collection of the material at the lower end of the tube 26 the bottom of the vat is made conical. The conical shaped bottom also assists the removal of the material contained in the receptacle. The lower end of the cone is connected to a large pipe 38 which has a valve 39. The cone thus directs the materials to the pipe 38 and they will pass out when the valve 39 is opened. If desired the material may be flushed out.

The fluid may be removed as may be desired. It may be decanted or siphoned or drawn off by cocks suitably located. I have provided a means, however, for filtering the fluids upon their removal from the tank. The filtration process may be, if desired, accomplished during the agitation process and the fluid constantly removed and while, if desired, fresh fluid is being directed into the tank through the pipe 121. The conical wall 37 is provided with openings 43 which extend from near the upper end of the wall 37 to a point near the lower end and near the apex of the cone. A porous wall 44 is located a short distance above the bottom 49 of the tank. A filter material 46, composed of asbestos, or any other suitable insoluble material, is located between the conical grid 37 and the wall 44. A filter cloth 45 is located between the filter material and the wall 44. A filter cloth 40 may also be located between the conical grid 37 and the filter material in order to prevent the filter material from being washed from beneath the conical grid into the body of the receptacle and up the tube 26 by the operation of the fluid entering through the pipe 30. The wall 44 may be provided with small openings 47. A chamber 48 is formed beneath the wall 44 and the bottom 49. The filtered fluid first collects in the chamber 48 and from thence it may be removed in some suitable way. For rapid and perfect operation of the filtration process I find it desirable to remove it by means of a suction pump 124 which is connected to the chamber 48 by means of the pipe 123. The pump may also be used for forcing the fluid to a higher level or operating on it in any way desired. The pipe 30 which is connected with the nozzle 31 passes through the chamber 48 and through the block 81 and the opening located in the porous wall 44 and also the opening in the apex of the inverted cone 37 and into the tube 26. The chamber is thus closed to the upper part of the receptacle except as it may be said to be connected through the filter.

Figure 7:
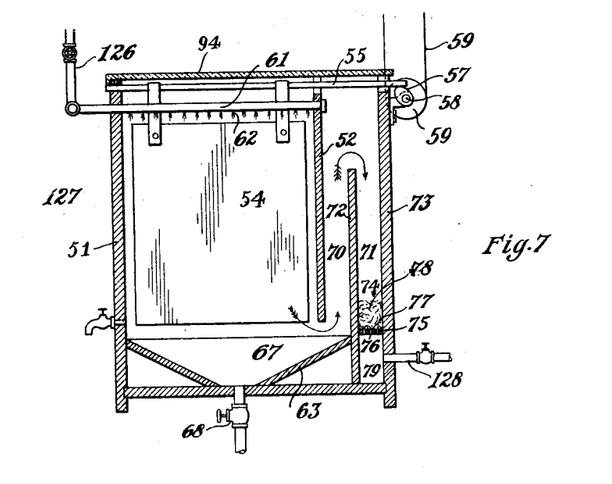
Figs. 7 and 8 illustrate a precipitating vat which is used in separating the metal from the chemical agents which were used in removing it from the ore.
Figure 8:
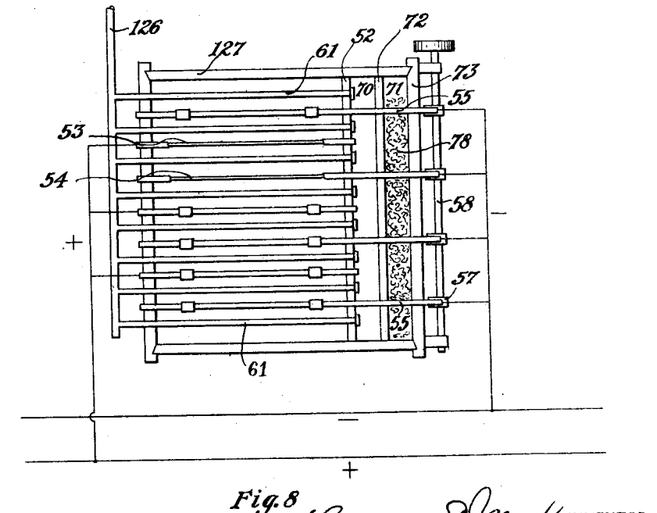

When the ore is leached in the solution for a sufficient time to allow the metal to be operated upon by the solvent the resultant solution containing the metal in the form of a soluble salt is removed from the agitator. It is directed into an electrolytic vat for the removal of the metal. The electrolytic vat is shown in Figs. 7 and 8. 51 and 52 are the side walls of the vat. 53 and 54 are the electrodes which are connected to the positive and negative terminals of the electric circuit and thus constitute the anodes and cathodes. The electrodes are placed alternately along the vat in making up the cell. They are supported by means of rods 55 which rest upon the walls of the vat. Each cathode 54 is attached to a rod 55 which extends across the top of the vat and over a cam 57. The cams 57 are supported on the shaft 58 which is connected to a belt and pulley 59. The pulley 59 when operated rotates the cams 57 and periodically raises the rods 55 and plates 54 and allows them to drop giving the plates 54 a jar when the rods 55 strike the wall. The metal or other electro-positive element may thus be jarred off from the plates. If it is deposited in the form of a powder it will fall usually of its own accord to the bottom of the vat but to insure its removal and to prevent any possible short circuiting and also to prevent any reaction between the solution about the plates and the precipitated metal it is removed from the plates by the shock that is produced in the operation of the cams and falls into a portion of a fluid out of the electric circuit and in the bottom portion of the vat and which will not act on the metal because of the satisfied condition of the active agents of that portion. The fluid may be directed into the top of the vat and removed from near the lower edges of the electrodes but at a point remote from the bottom so as to assist in the downward movement of the precipitate and yet so as not to disturb the fluid in the bottom of the vat. The solution is directed into the vat through the pipes 61 having openings 62. The pipes are connected to the main pipe 126. The small openings will permit the entry of the solution without disturbance of the solution that may be in the vat. The bottom wall of the vat 63 is conical. The precipitates from the cathodes will be collected in the space 67 formed in the bottom of the vat and may be removed through the gate valve 68.

The vat is provided with chambers 70 and 71 which are formed between the walls 52, 72 and 73. The wall 72 is not as high as the walls 52 and 73. The bridge wall 52 extends down so that its lower edge is about at the level of the lower edge of the electrodes. The fluid from the plate passes quietly down underneath the lower edge of the wall 52, it then rises to the upper edge of the wall 72, and then descends through the chamber 71. It is thus permitted to enter the vat and be removed without disturbance of the solution contained in the bottom portion 67 of the vat where the metal is collected.

A filter 74 is located in the chamber 71. It is supported by a porous wall 75 which may be made of a porous material or it may have openings 76. The filter cloth 77 is placed over the wall 75 and filter material 78 is placed over the filter cloth. The filter material may be composed of any suitable material, such as asbestos and the like which will not be acted upon by the solution removed from the vat. The length of the chamber gives a large horizontal cross section to the filter through which the solution is removed. The wall 75 forms a chamber 79 where the filtered fluid is first collected from whence it may be removed by pipe 128. The vats are provided with transparent covers which are preferably made of panels to allow light in.

If the upper ends of the chambers 70 and 71 are closed the chambers will form a siphon which will permit a quiet removal of the fluid from the vat when the head of the solution is raised above the upper wall of the siphon thus formed. The solution may be directed to the ore for treating the same charge a second time or a new charge of the ore to a suitable container, while the precipitating metal and the solution in which it is deposited is directed into another receptacle wherein the fluid is separated from the metal. The metal is collected and melted into suitable form for commercial purposes while the fluid which has not been operated upon in the electrolytic process may be directed to the precipitating vat 127 with fluids coming from the ore.

Figure 9:
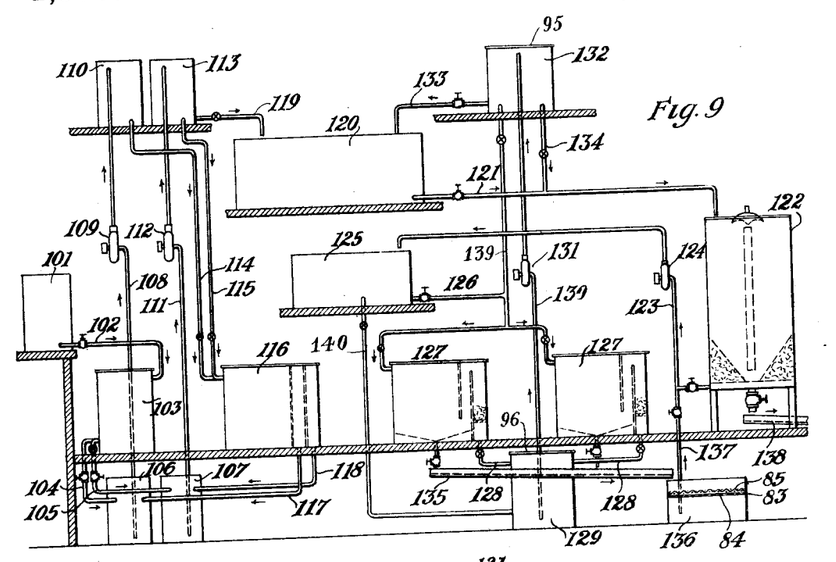
Figs. 9 and 10 show a diagrammatic arrangement of the vats and receptacles used in extracting metals from their ores.

The receptacle for receiving the metal is shown in Fig. 9. The receptacle 136 is provided with a plate 83 which is supported near the top of the receptacle. The plate 83 is provided with openings 84 and is preferably covered with the filter cloth 85. The metal precipitates are directed into the top of the receptacle 136 with the fluid contained in the bottom of the vats 127 and the precipitates are collected on the plates 83 while the fluid passes through the filter cloth and the openings into the bottom of the receptacle. The precipitates may be removed from the plate 83 while the fluid which collects in the bottom may be directed to the vats 127 for a subsequent operation together with solution obtained from the ore.

Figure 10:
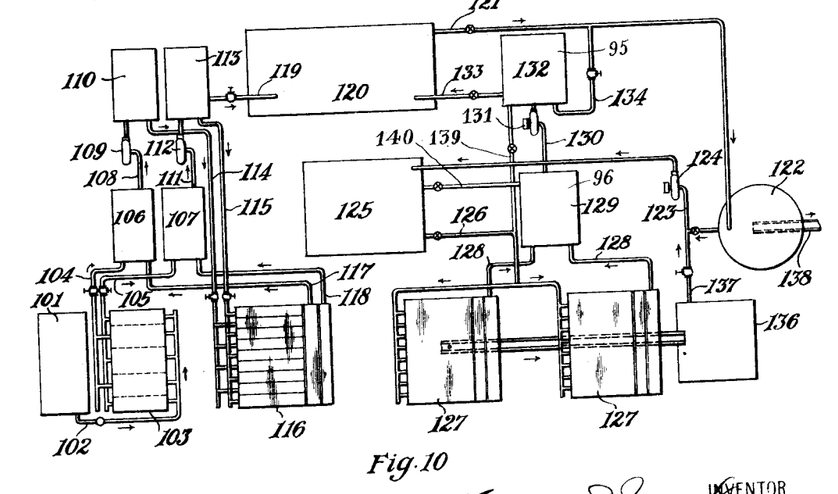

The connections of the vats and receptacles are shown diagrammatically in Figs. 9 and 10. 101 is a receptacle for containing the sodium chlorid solution concentrated to a proper degree. 103 is the vat in which the preliminary processes are accomplished. The solution from receptacle 101 is directed through the pipe 102 into the compartments of the vat 103.

Passing an electric current through an aqueous solution of sodium chlorid while using metallic anodes which produce a salt soluble in the solution produced by the electrolytic process, results in the decomposition of the sodium chlorid solution and dissolution of the metal of the anode. The sodium and hydrogen are liberated at the cathodes and in the solution of the cathode compartments. The current also liberates free and nascent chlorin and oxygen at the anodes and in the anode compartments. Chlorids of the anode metal are formed and some free chlorin remains in the solution. If iron anodes are used the result of the reaction and electrolysis will be the formation of ferrous and ferric chlorids by some of the chlorin combining with the iron. If the current is continued for a sufficient length of time all the chlorin contained in the solution will pass to the anode compartments. The sodium is deposited in the cathode compartments and it there decomposes the water of the solution and forms caustic soda. The iron dissolved in the anode solution, is partly transferred to the cathodes by electrolysis but as fast as it is transferred, it is precipitated in the compartments of the cathodes by the caustic soda formed in the cathode solution and falls to the bottom of the compartment. But as the iron of the anode dissolves faster than it can be deposited at the cathodes, the surplus chlorids of iron is retained in the anode compartments.

The pipes 104 are connected to the cathode compartments and the pipes 105 are connected to the anode compartments. They are adapted to receive the fluids formed in the compartments and direct them into the receptacles 106 and 107. The fluids are pumped from the receptacle 106 through pipes 108, pump 109, to the receptacle 110 and also from receptacle 107 through pipe 111, pump 112 to the receptacle 113. Pipes 114, 115, direct the fluids from the receptacles 110 and 113 to the cathode and anode compartments of the vat 116, so that the solution entering the anode compartments of the vat 116 is substantially like that delivered from the anode compartments of the vat 103, at least so far as any elements or compounds which may be affected by the electrolysis in the vat 116 are concerned. The same is also true of the fluid entering the cathode compartments of the vat 116 which are substantially of the same character as that obtained from the cathode compartments of the vat 103. The anode compartments of vat 116 thus receive the ferrous and ferric chlorids and free chlorin in solution while the cathode compartments receive part of the original sodium chlorid solution and some caustic soda in solution. The object in changing the solution from one vat to the other is to convert all the chlorid of a lower order in the anode divisions to the chlorid of a higher order, in this case from ferrous chlorid to ferric chlorid and to produce free chlorin which cannot be done while the iron is present in a metallic state. In the course of the electrolysis sodium and hydrogen are deposited at the cathodes and chlorin and oxygen at the anodes. Part of the nascent hydrogen and part of the nascent chlorin which collects at the top of the plates, may, if desired be united to form hydrochloric acid. This is dependent upon the amount of light given or the confinement of the gases. At the same time the chlorin combines with the ferrous chlorid that passes over with the solution and converts it into ferric chlorid.

When all the ferrous chlorid in the solution is converted into ferric chlorid the preparation of the solvent is finished. The anode compartment then contains solutions of ferric chlorid, free chlorin and also if desired some hydrochloric acid. Other chlorin compounds such as chlorous and chloric acids, etc., may be formed in the electrolytic processes and are usable in the decomposition of the ores. The solvent thus formed in the anode compartments and containing the active agents is next directed to a container or is applied to the ore. The solution from the cathode compartments is drawn off into a separate tank and may be used as a by-product of the process.

The solution from the compartments of the vat 116 is drawn off through the pipes 117 and 118 which lead to the receptacles 106 and 107 which together with the fluids from the vat 103 are again directed to the receptacles 110 and 113 which contain a mixture of the fluids from the cathode and anode compartments of the vats 103 and 116 respectively. It is found by thus mixing the solutions the active agents may be produced most economically.

The fluids contained in the receptacle 113 are directed through the pipe 119 into the container 120. The fluid from this container is directed as may be desired through the pipe 121 into the agitator 122 where it is brought in contact with the ground ore. The ore is then thoroughly leached with the solution.

When the ore is leached for a sufficient time to allow the ferric chlorid and the chlorin and the chlorin acids, that is, the active elements and compounds in the solution to form chlorids of the metals in the ore the solution is drawn off and the new solution added until all the copper of the ore is reduced to a chlorid. If the ore contains copper and iron, the solution carrying potentially active chlorin elements gives up a part of the chlorin: the ferric chlorid is reduced to ferrous chlorid, some of its chlorin being liberated, and the free chlorin thus liberated and the chlorin in the solution and the acids attack the copper and form cuprous and cupric chlorids. If the cupric chlorid in solution is allowed to remain in contact with the ore, it will in turn attack the copper of the ore and form cuprous chlorid thereby taking out an additional amount of the copper from the ore. When the chlorids of the metals of the ore are formed the solution is drawn off and the charges of ore may be again treated with another charge of the solution or another charge of the ore may be leached with fresh solution.

The fluid produced in the agitator is drawn through the filter by means of the pipe 123 and the pump 124 and forced upward into the container 125. The fluid containing cuprous or cupric chlorid and the salts formed in the leaching process may then be conducted through the pipe 126 into the vats 127, where the copper is removed by electrolysis. It may be separated from the solution on the cathode either in the form of electrolytic copper plate or as spongy copper. At the same time that the copper is separated from the solution the chlorin with which it was combined while in solution is restored to substantially its original potential chemical energy in the solution forming substantially the same compounds and free chlorin. The ferrous chlorid is changed to ferric chlorin, free chlorin is restored to the solution and hydrochloric acid is formed if desired, the same as in the original solution. The copper in the solution, being more electro-negative than iron, is deposited at the cathode first, and with the proper current density, hydrogen will also be formed at the cathode from the decomposition of the aqueous solution and oxygen and chlorin will be collected at and in the vicinity of the anodes with the result that the copper is deposited in the form of powder and precipitates to the bottom of the vat. At the same time part of the nascent hydrogen and chlorin may be combined to form hydrochloric acid while some of the free chlorin remains in the solution. The solution below the electrodes remains unchanged. In this condition it is non-active and it will not dissolve the copper precipitates that fall from the plates into it. When the ferrous chlorid is converted to ferric chlorid the current is turned off. It is found by practical working of the process that to continue the current on the solution for a longer period, its power to dissolve copper is gradually destroyed for the following reasons: When a current is passed through an electrolyte carrying cupric chlorid, or cuprous chlorid and ferrous chlorid the result will be that all the copper will be deposited at the cathode as metallic copper, and some hydrochloric acid and chlorin may be formed; then all the iron is deposited as metallic iron; the hydrogen as a gas is freed at the cathode and the chlorin as a gas is liberated at the anode.

By practical working of the process I have found that when the ferrous chlorid is converted to ferric as above described, it then contains free chlorin and if desired hydrochloric acid and other chlorin compounds and is in condition to be used over again as a solvent. It contains substantially the same active chemicals contained in the original solution.

The vat 125 may be raised to a higher level than that shown in order to give sufficient pressure to the fluid to cause it to spray against the plates and on to the surface of the fluid contained in vats 127 through the openings 61 in pipes 62 connected to pipe 126. This will keep gases which are formed at the anodes and cathodes such as chlorin and hydrogen in the solution and will prevent the collection of the copper powder on the surface which is caused by the rising hydrogen bubbles. The spraying fluid will drive the copper precipitate below the surface tension or the skin of the fluid and will separate it from the bubbles of the gases formed in the electrolytic process.

The fluid in the vats 127, 127 is conducted through the pipes 128 into the receptacle 129 and thence, through the pipe 130, by means of the pump 131, it is raised to the receptacle 132. It is then conducted back to the vats 127 through the pipe 139. The pump 131 thus circulates the fluid over the plates and through the vats 127, 129, and 132 until all the copper is removed. The vat 125 may be placed on a level with vat 132 and the fluid allowed to fall to the plates. It may be connected with vat 132 and the fluid allowed to fall through pipes 139 and 126. It may be connected with 129, as shown through pipe 140 and raised to vat 132 and allowed to fall through pipe 139 from whence it flows again to vat 129 and so on circuitously. When all the copper is removed and the fluid is completely revived it may then be conducted through the pipe 133 to the container 120 or it may then be conducted through the pipe 134 to the agitator 122. The metal precipitates and the fluid in the bottom of the vat is conducted by means of the launder 135 into the receptacle 136 where they are separated. The fluid collected in the bottom of the receptacle, 136 may be raised through the pipe 137 by means of the pump 124 and directed to the container 125. The vats 129 and 132 may be covered with covers 95 and 96 to keep in the gases formed in vats 127.

The insoluble materials formed in the solution after the ore is leached is delivered from the agitator 122 through the pipe or launder 138. The pipes are all provided with suitable valves for opening and closing the passages as may be desired.

In the many experiments and practical tests that I have made with this process it appears that the solvent produced as above is exceedingly efficient. However, it is to be understood that I do not confine myself to the exact process or means specified herein for the production of the solution containing the active elements. The active chlorin attacks the copper and the iron of the ore and the solution may be revived upon the extraction of the copper contained in it as above described.

It is found after a long series of practical tests that the reactions that take place under the above conditions are substantially as specified, but whatever may be the reactions or whatever active agents may be produced in carrying out the process the electrolytic reduction of copper from its ore, which has been selected for the purpose of illustration only, is accomplished by the steps described.

The invention may be modified by those skilled in the art to which it pertains without departing from the spirit thereof. The invention itself may be used in carrying out many chemical or electrolytic processes to accomplish many results, what I have described above being merely an illustrative apparatus involving and containing the essence of the invention.

What I claim is new and desire to secure by Letters Patent is as follows—

1. In an apparatus for the extraction of metal from ore the combination of two electrolyzing vats having anode and cathode compartments for containing the electrodes and fluids, the anode and cathode compartments of one vat being connected with same compartments of the other vat, means for mixing the fluids produced in the anode compartments of the said vats, a leaching means for bringing the ore and the said mixed fluids into contact, a third precipitating vat adapted to receive the solution from the said leaching means.

2. In an apparatus for the extraction of metal from ore which consists in two electrolyzing vats divided into anode and cathode compartments one of said compartments adapted to receive the anodes and the other to receive the cathodes, the cathode compartments of one vat adapted to receive the solution from the cathode compartments of the other vat and the anode compartments of one vat adapted to receive the fluid from the anode compartments of the other vat, a receptacle adapted to mix the fluids, a leaching means adapted to bring said mixture into contact with the ore, a precipitating vat adapted to separate the metal from the solution formed in leaching the ore and to revive the fluid by means of the elements separated from the metal in the precipitation process, means for directing the revived solution to a container containing the mixture of the fluids from the anode compartments of the first two named electrolyzing vats.

3. In an apparatus for extracting metal from its ore which consists in means for leaching the ore with a solution adapted to attack the desired metal, means for precipitating the metal in the solution obtained in the leaching process and means for separating the active agents of the original solution from the metal, means for collecting the metal at the bottom of the precipitating vat into the non-active solution, a receptacle connected with the bottom of the said vat and having means for separating the metal from the nonactive fluid into which it is precipitated.

4. In an electrolyzing vat the combination of a plurality of diaphragms adapted to divide the vat into a plurality of anode and cathode compartments, anodes located in the anode compartments and cathodes located in the cathode set of compartments, pipe connections adapted to connect the cathode compartments together at the top of the compartments, pipe connections adapted to connect the anode compartments together at the top of the said compartments, a pair of chambers adapted to collect the fluid from the said compartments, the top of the said chambers connected with the bottom of the said compartments, pipes connected to the bottom of the said chambers for removing the fluid from the chambers.

5. In an electrolyzing device the combination of a vat having a plurality of walls adapted to divide the vat into chambers, one of the said chambers having diaphragms adapted to divide the said chamber into compartments, anodes located in alternate compartments partments and cathodes located in the remaining compartments, another of the said chambers connected with the compartments containing the anodes and a third chamber connected with the compartments containing the cathodes and filters located in the two last mentioned chambers.

6. In a precipitating vat the combination of a plurality of electrode plates, an inner bridging wall located between the said plates and the outer wall of the tank and a partition wall located between the said inner wall and the said outer wall, inlets and outlets adapted to permit fluid to pass into the vat under the bridging wall and over the partition wall.

7. In a precipitating vat the combination of a plurality of electrode plates, an inner bridging wall located between the said plates and the outer wall of the tank and a partition wall located between the said inner wall and the said outer wall and a filter in the space formed between the partition wall and the said outer wall.

8. In a precipitating vat the combination of a plurality of electrode plates, a wall adapted to form a chamber in the said vat, a filter located in the said chamber.

9. In a precipitating vat the combination of a plurality of electrode plates, a plurality of chambers, inlet and outlet means for fluid adapted to direct the fluid on to the top of the plates and remove the fluid from the bottom of the plates and through the said chambers in succession, a filter located in one of the said chambers.
10. In a precipitating device the combination of a vat divided into two parts, electrodes located in the upper part, the lower part adapted to receive material precipitated from the said electrodes and at a point somewhat remote from the said electrodes, a bridging wall extending down to the lower edge of the said electrodes, inlet and outlet pipes adapted to direct fluid into the vat at the top of the plates and to remove the fluid from beneath the bridging wall.

11. In a precipitating device the combination of a vat divided into two parts, electrodes located in the upper part, the lower part adapted to receive material precipitated from the said electrodes and at a point somewhat remote from the said electrodes, a bridging wall extending down to the lower edge of the said electrodes, a partition wall adapted to divide the space formed between the bridging wall and the outer wall into two chambers, filter means located in one of the said chambers, inlet and outlet pipes adapted to direct fluid into the vat at the top of the plates and through the filter.
12. In a precipitating device the combination of a vat divided into two parts, electrodes located in the upper part, the lower part adapted to receive material precipitated from the said electrodes and at a point somewhat remote from the said electrodes, a bridging wall extending down to near the lower edge of the said electrodes, a partition wall adapted to divide the space formed between the bridging wall and the outer wall into two chambers, a filter located in one of the said chambers, inlet and outlet pipes adapted to direct fluid into the vat at the top of the plates and through the filter, and means for removing the material from the bottom of the vat.

13. In a precipitating vat the combination of a plurality of electrode plates, a plurality of fluid inlet pipes located above the said electrodes, each pipe having a plarality of openings, an outlet pipe adapted to remove fluid from the bottom of the electrode plates, rods for supporting the said electrode plates and means for jarring the said plates by lifting the said rods and letting them fall.

14. In a precipitating vat the combination of a plurality of electrodes, a plurality of pipes located at the top of the said electrodes, each pipe having a plurality of openings, a plurality of bars adapted to support the said electrodes, a mechanical means for intermittently raising and dropping the said bars and electrodes, a space located in the bottom of the vat for collecting precipitate formed on the electrodes, a bridging wall and a partition adapted to form two chambers between the bridging wall and the outer wall of the vat, the said bridging wall extending downward to near the space in which the precipitate is collected, the partition wall extending upward to a point below the upper part of the electrodes, a filter located between the partition and the outer wall, a pipe for removing the fluid from beneath the filter and a pipe for removing the material in the bottom of the vat.

In testimony whereof, I have signed my name to this specification, in the presence of two subscribing witnesses.

HENRY S. MacKAY.

Witnesses:
A. V. Amos,
W. G. Lesing.

Copies of this patent may be obtained for five cents each, by addressing the "Commissioner of Patents, Washington, D. C."